US012631196B2

(12) United States Patent
Branham

(10) Patent No.: US 12,631,196 B2
(45) Date of Patent: May 19, 2026

(54) VENTILATION FAN MOUNTING SYSTEM

(71) Applicant: Ascent Holdings, LLC, Gig Harbor, WA (US)

(72) Inventor: Tony J. Branham, Gig Harbor, WA (US)

(73) Assignee: Ascent Holdings, LLC, Gig Harbor, WA (US)

( * ) Notice: Subject to any disclaimer, the term of this patent is extended or adjusted under 35 U.S.C. 154(b) by 9 days.

(21) Appl. No.: 18/812,591

(22) Filed: Aug. 22, 2024

(65) Prior Publication Data

US 2025/0067279 A1 Feb. 27, 2025

Related U.S. Application Data

(60) Provisional application No. 63/578,348, filed on Aug. 23, 2023.

(51) Int. Cl.
*F04D 17/08* (2006.01)
*F04D 29/62* (2006.01)
*F15B 15/18* (2006.01)

(52) U.S. Cl.
CPC ........... *F04D 29/626* (2013.01); *F04D 17/08* (2013.01); *F15B 15/18* (2013.01)

(58) Field of Classification Search
None
See application file for complete search history.

(56) References Cited

U.S. PATENT DOCUMENTS 6,261,175 B1 * 7/2001 Larson .................... F24F 7/007 415/204
6,802,770 B2 10/2004 Larson et al.
7,455,500 B2 11/2008 Penlesky et al.
9,689,581 B2 6/2017 Zakula et al.
10,502,447 B2 12/2019 Branham
11,015,822 B2 5/2021 Branham
11,686,483 B2 6/2023 Branham
(Continued)

FOREIGN PATENT DOCUMENTS

FR 2105109 A7 4/1972

OTHER PUBLICATIONS

Apple Barrel, "Delta Breez Integrity 100 CM Exhaust Bath Fan, LED Edge-Lit Flat Round Panel Light, Energy Efficient Quiet Operation Ceiling Mount Motor, White," retrieved from https://www.amazon.com/DELTA-ELECTRONICS-AMERICAS-LTD-ITG100RLED/dp/B083KP2KZF, retrieved on Aug. 12, 2024, 6 pages.

(Continued)

*Primary Examiner* — Steven M Marsh

(74) *Attorney, Agent, or Firm* — Seed Intellectual Property Law Group LLP

(57) ABSTRACT

An assembly for mounting an object in an opening in a structural member that includes a housing to house the object, the housing having four walls and four corners where adjacent walls meet, and a first flute formed in a first wall that has a first end and a terminal end, the terminal end forming an opening in the adjacent wall that is adjacent to a first corner formed by the first wall and an adjacent wall, and a second flute formed in a second wall that is opposite the first wall, the second flute having a first end and a terminal end, the terminal end forming an opening in the adjacent wall that is adjacent to a second corner formed by the second wall and the adjacent wall.

8 Claims, 7 Drawing Sheets

(56) References Cited

U.S. PATENT DOCUMENTS

| | | | | |
|---|---|---|---|---|
| 2005/0111840 A1* | 5/2005 | Craw | F24H 3/0411 392/350 |
| 2005/0111972 A1* | 5/2005 | Penlesky | F04D 29/626 415/206 |
| 2005/0218289 A1* | 10/2005 | Penlesky | F04D 29/601 248/213.2 |
| 2020/0200412 A1* | 6/2020 | Singh | F24F 7/10 |
| 2020/0217532 A1* | 7/2020 | Branham | F24F 7/06 |
| 2023/0012260 A1* | 1/2023 | Servies | F04D 29/601 |
| 2024/0410597 A1* | 12/2024 | Chuang | F24F 1/0018 |

OTHER PUBLICATIONS

AR Supply, "50 CFM Housing Bathroom Exhaust Fan," retrieved from https://www.ar-supply.com/products/50-cfm-housing-bath-exhaust-fan, retrieved on Aug. 12, 2024, 3 pages.

* cited by examiner

VENTILATION FAN MOUNTING SYSTEM

BACKGROUND

Technical Field

The present disclosure pertains to the mounting of objects within a structural member, such as a wall, ceiling, and the like and, more particularly, to a ceiling or wall exhaust fan mounting apparatus for simplified and secure installation.

Description of the Related Art

Installation of objects, such as fans, light fixtures, controls, and the like in the interior of a residence or business can be complex and time consuming. In addition to the task of forming the correct opening, the installer must adequately fasten the object to the structural support. This requires the use of the correct fasteners, tools, and proper technique, and it typically requires access to the back side of the surface, such as via an attic for ceiling mount locations. It is desirable to provide a housing and mounting system that enables the installer to mount the housing from the interior of the room or space and thus avoid having the installer access the back side of the structural member, such as entering an attic or crawl space to install the housing. It is also desirable to provide for mounting to the structural member without the use of fasteners or tools, and to facilitate connection to existing or new ducting within a constrained space.

One outdated ventilation housing design is found in U.S. Pat. No. 9,689,581 issued to Broan-NuTone LLC in 2017, which discloses a ventilation housing having large vertical ears extending from opposing vertical corners of the housing. These ears are almost as tall as the housing and extend far beyond an adjacent side of the housing. Attachment to a structure is with the ears, or ear mounting. There are several disadvantages to ear mounting, including eventual sagging of the ventilation fan housing. Ear mounts situate the screws holding the fan ½ inch to 1 inch away from the fan housing. This allows the ears to bend overtime and allow the sag on the opposite hanging side. Ear sagging happens between the metal fan housing frame and the screw location.

Hence, there is a need for an improved mounting system that overcomes the disadvantages of the ear mounting system.

BRIEF SUMMARY

The present disclosure is directed to a ventilation fan mounting assembly that facilitates installation of an object, such as a ventilation or exhaust fan, in a rough opening in a structural member, for example a wall or ceiling, provides an effective air seal to increase the effectiveness of evacuation of air and vapor through the ventilation fan, as well as presents an attractive cosmetic appearance when mounted. In accordance with one implementation of the present disclosure, a housing assembly is provided that includes at least one channel or flute formed in opposing first and second side walls, each flute having a terminal end that opens to a corner formed by the respective first and second wall and an adjacent wall.

In accordance with another aspect of the present disclosure, an assembly for use in mounting an object in an opening in a structural member is provided, the structural member having opposing first and second surfaces. The assembly includes a housing that is sized and shaped to define an interior to house the object and that can be received within the opening in the structural member, the housing having four walls and having four corners where adjacent walls of the four walls meet; and a first flute formed in a first wall that has a first end and a terminal end, the terminal end forming an opening in the adjacent wall that is adjacent to a first corner formed by the first wall and an adjacent wall, and a second flute formed in a second wall that is opposite the first wall, the second flute having a first end and a terminal end, the terminal end forming an opening in the adjacent wall that is adjacent to a second corner formed by the second wall and the adjacent wall.

In accordance with another aspect of the present disclosure, the first and second flutes are concave and have an arcuate cross-sectional configuration.

In accordance with another aspect of the present disclosure, each of the first and second flutes taper in diameter from the first end to the terminal end such that the first and second flutes have a larger diameter at the terminal end and a smaller diameter at the first end.

In accordance with a further aspect of the present disclosure, the housing includes a first tab extending from a distal end of the housing, the first tab sized and shaped to be bent to bear against the first surface of the structural member, and a second tab extending from the distal end of the housing, the second tab sized and shaped to engage the second surface of the structural member adjacent the opening and to attach the housing to the structural member, and wherein the first and second tabs are integrally formed with at least one wall, are co-planar with the at least one wall, and are formed of bendable material that retains a bent shape and can be bent more than once without failure, the first and second tabs having a thickness that enables manual bending of the first and second tabs from an original position to at least an angle of 90 degrees with respect to the at least one wall.

In accordance with another aspect of the present disclosure, a housing is provided for use in mounting an object to a structure. The housing includes a plurality of walls sized and shaped to define an interior to house the object, and a plurality of corners where adjacent walls of the plurality of walls meet; and a first flute formed in a first wall that has a first end and a terminal end, the terminal end forming an opening in the adjacent wall that is adjacent to a first corner formed by the first wall and an adjacent wall, and a second flute formed in a second wall that is opposite the first wall, the second flute having a first end and a terminal end, the terminal end forming an opening in the adjacent wall that is adjacent to a second corner formed by the second wall and the adjacent wall.

In accordance with still yet another aspect of the present disclosure, the first and second flutes are concave and have an arcuate cross-sectional configuration.

In accordance with yet another aspect of the present disclosure, each of the first and second flutes taper in diameter from the first end to the terminal end such that the first and second flutes have a larger diameter at the terminal end and a smaller diameter at the first end.

In accordance with a further aspect of the present disclosure, the housing includes a first tab extending from a distal end of the housing, the first tab sized and shaped to be bent to bear against the first surface of the structural member, and a second tab extending from the distal end of the housing, the second tab sized and shaped to engage the second surface of the structural member adjacent the opening and to attach the housing to the structural member; wherein the first and second tabs are integrally formed with at least one wall, are co-planar with the at least one wall, and are formed of bendable material that retains a bent shape and can be bent more than once without failure, the first and second tabs having a thickness that enables manual bending of the first and second tabs from an original position to at least an angle of 90 degrees with respect to the at least one wall.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
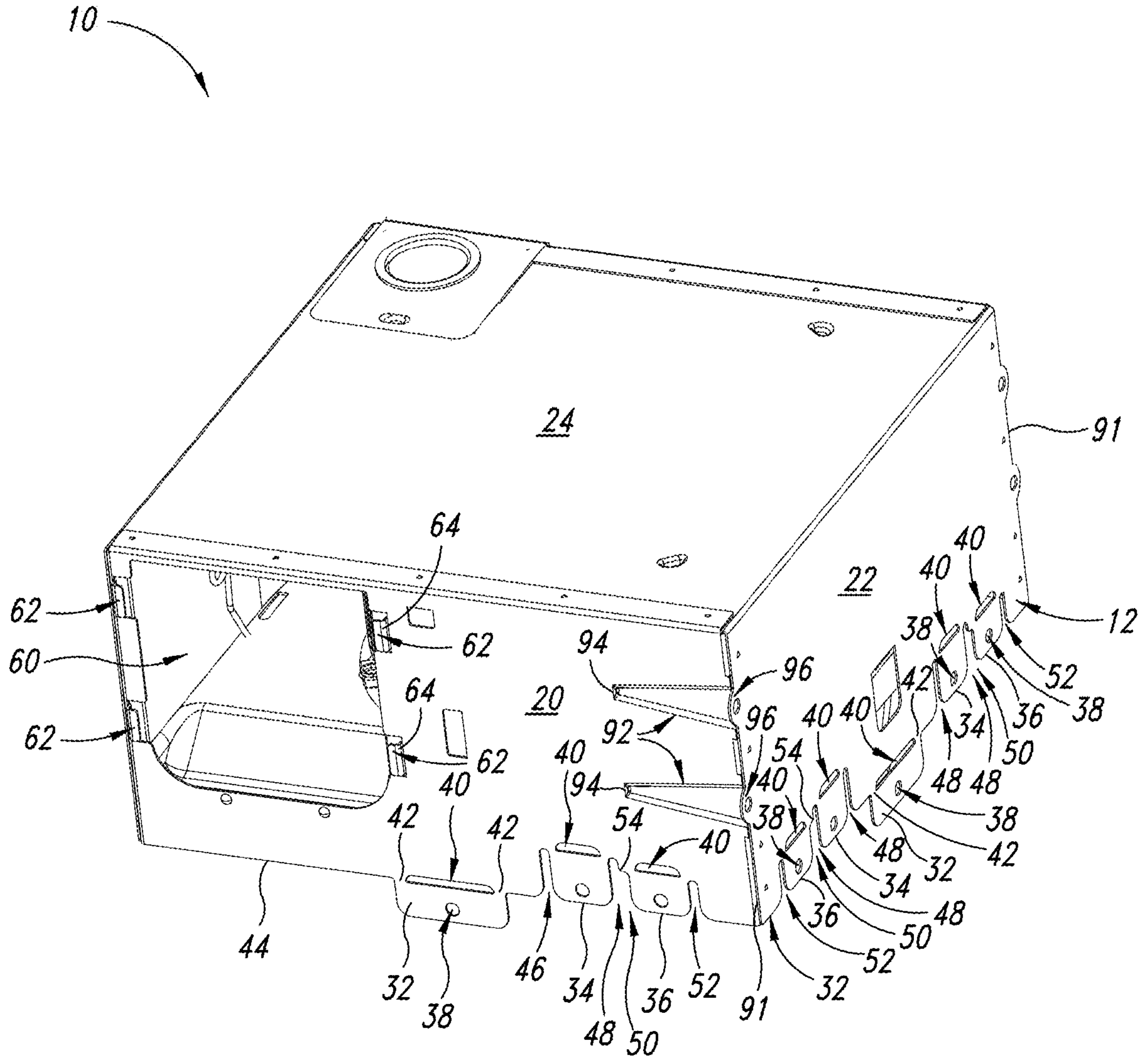
FIG. 1 is a bottom, right, front axonometric view of a ventilation fan housing with mounting system formed in accordance with the present disclosure.
Figure 2:
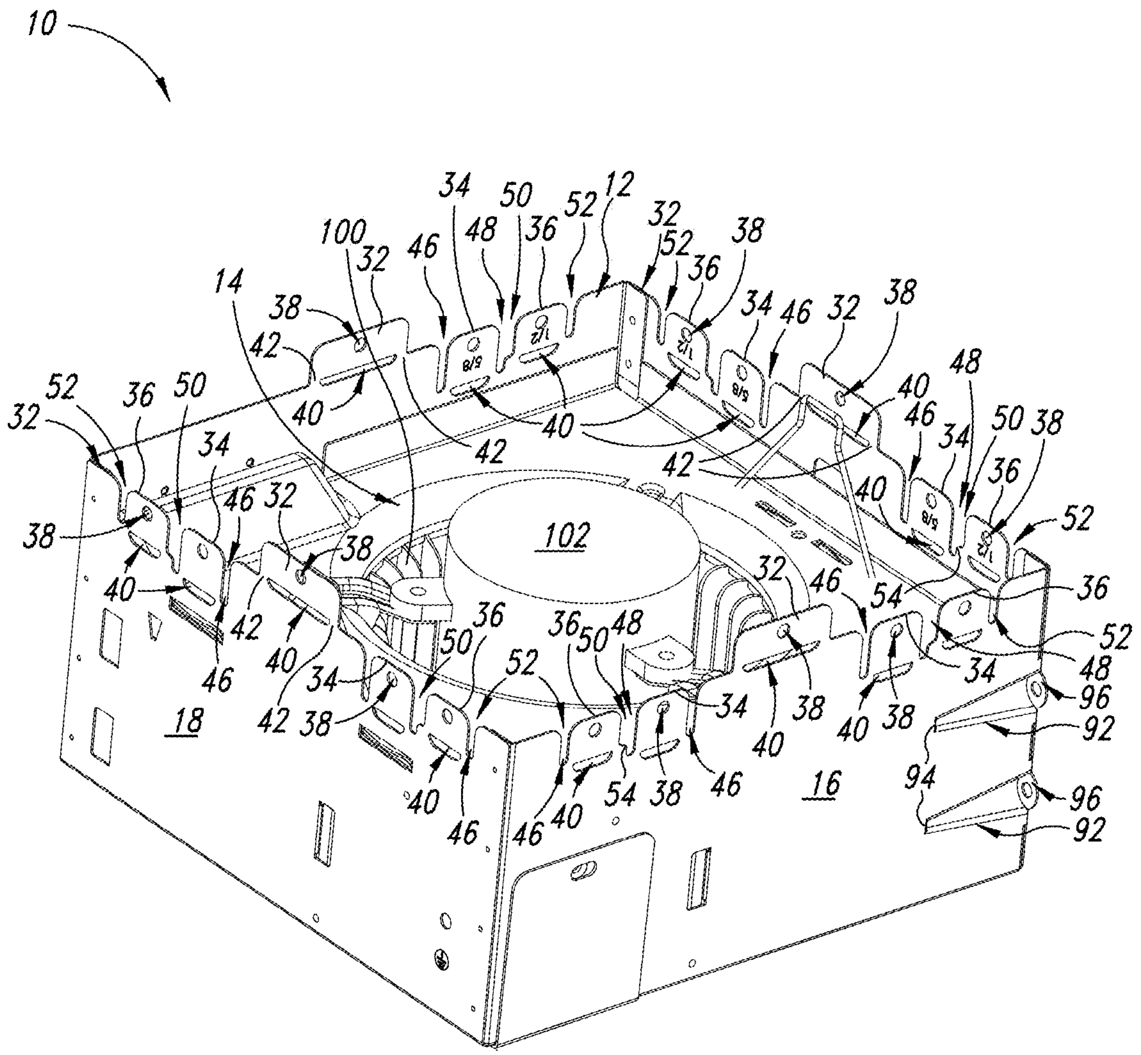
FIG. 2 is a bottom, left, rear axonometric view of the ventilation housing of FIG. 1.
Figure 3:
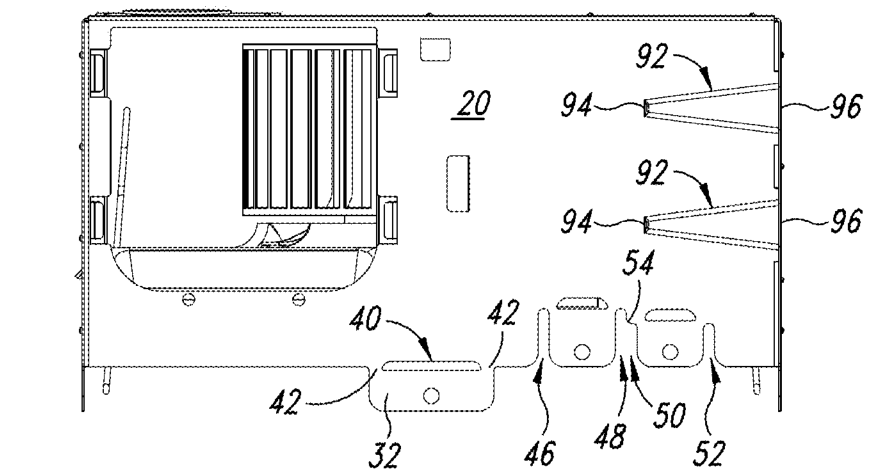
FIG. 3 is a front view thereof.
Figure 4:
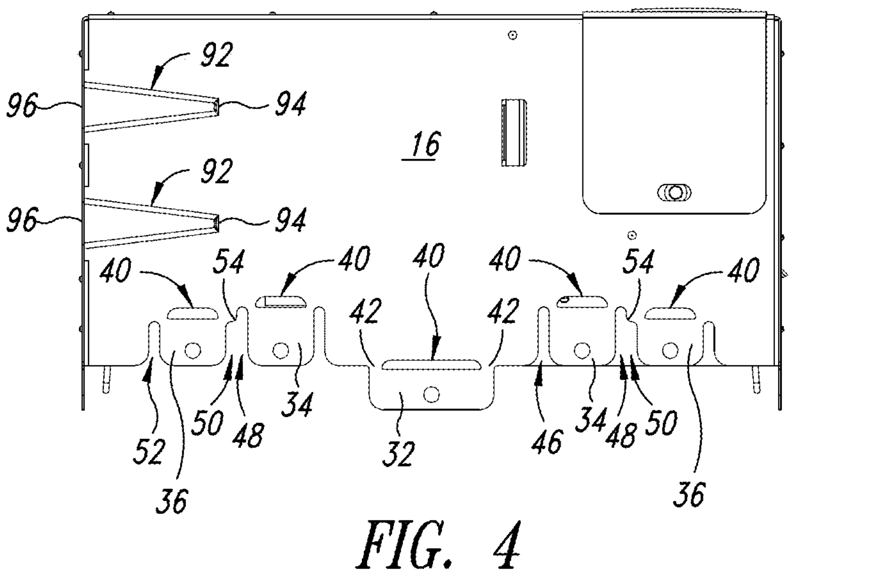
FIG. 4 is a rear view thereof.
Figure 6:
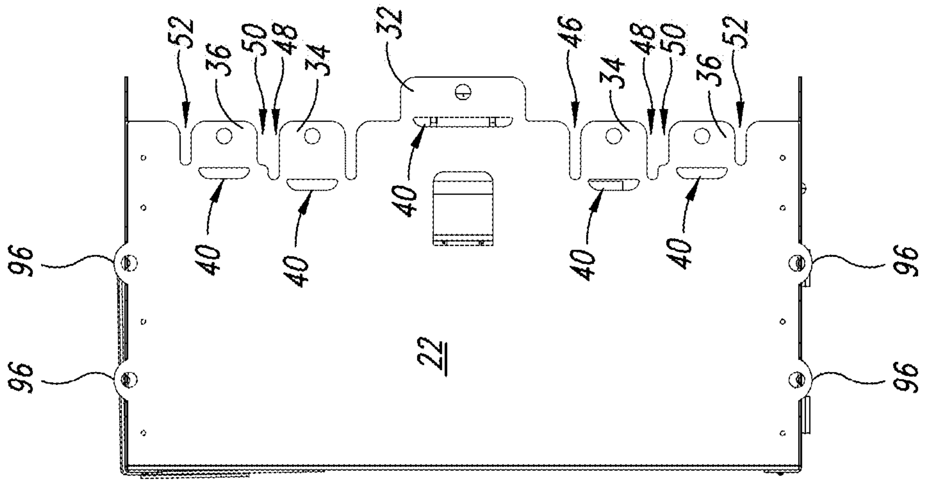
FIG. 6 is a right side view thereof.
Figure 5:
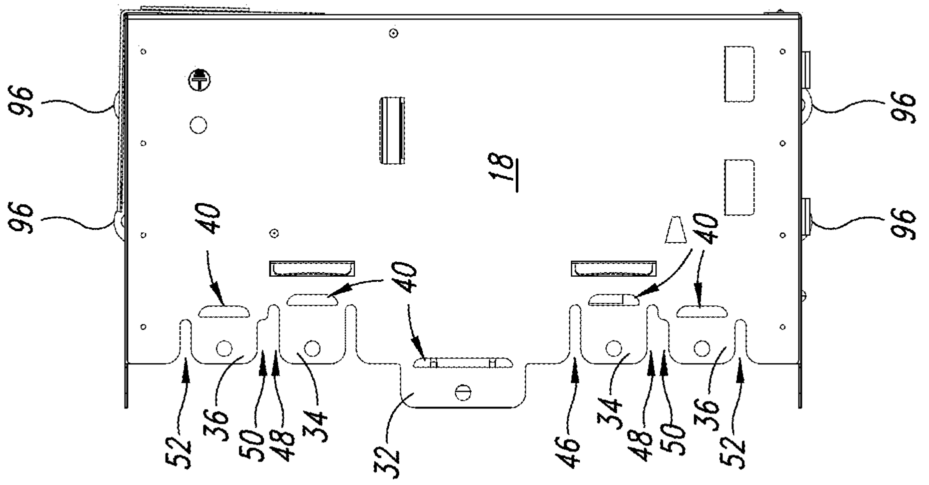
FIG. 5 is a left side view thereof.
Figure 7:
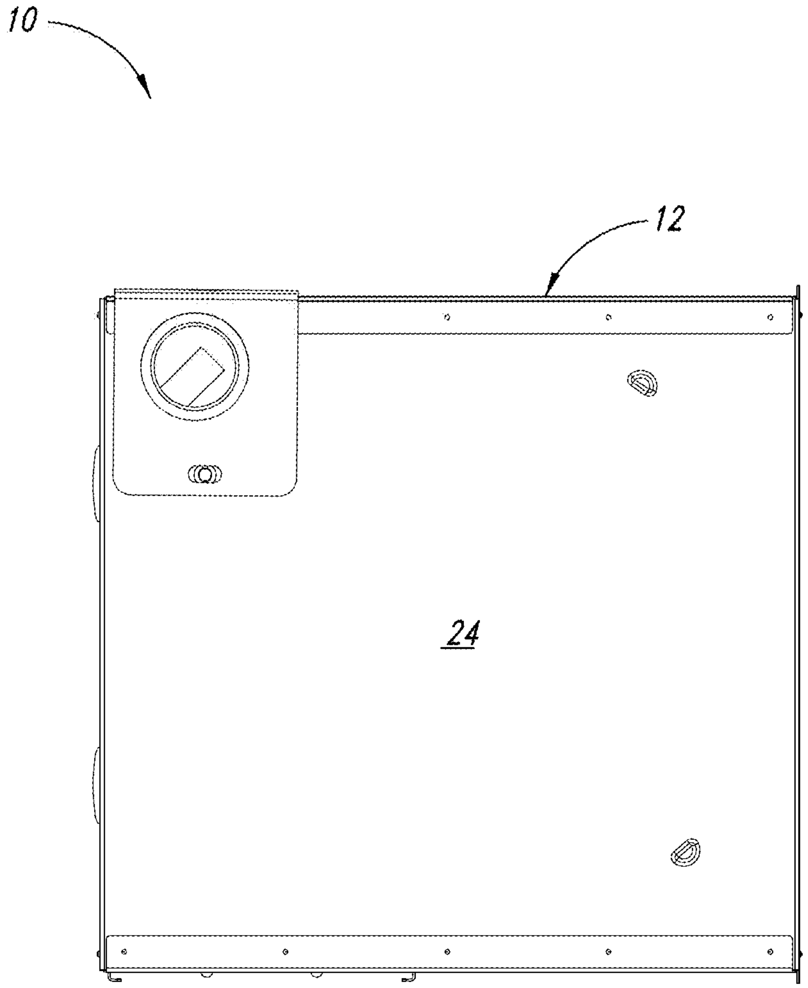
FIG. 7 is a top plan view thereof.
Figure 8:
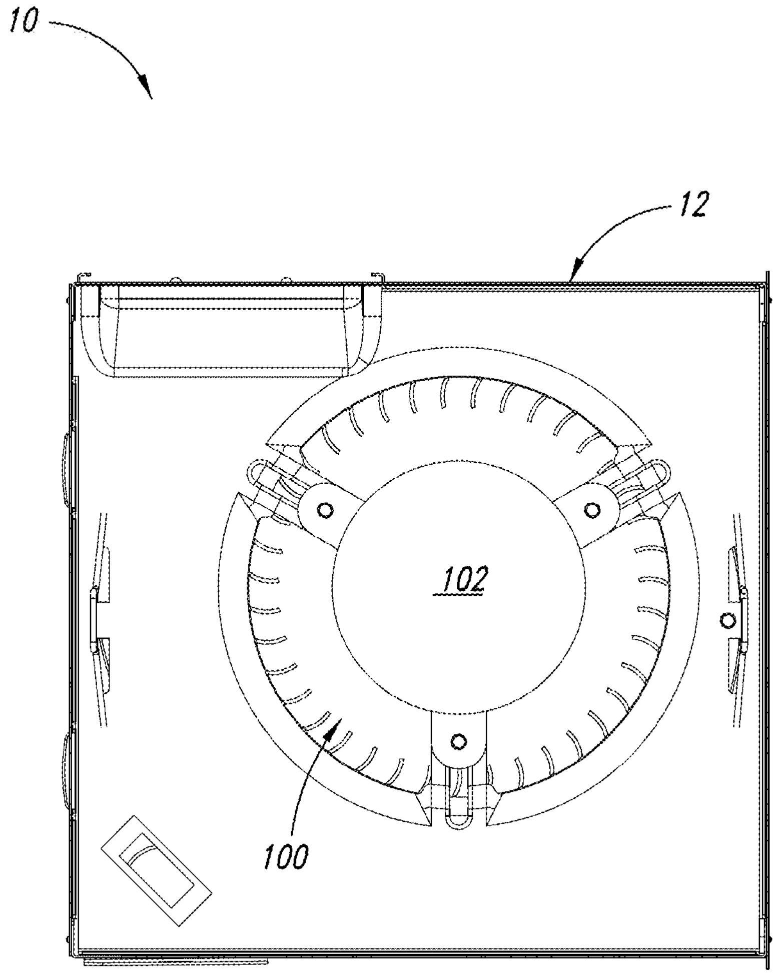
FIG. 8 is a bottom plan view thereof.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with the use of fans, ducting, panels, walls, ceilings, and doors, as well as framing for walls, ceilings, doors, and the like, and installation processes for ceiling and wall fans have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

Referring to FIGS. 1-8, shown therein is a housing 10 formed of at least one wall 12 that defines an interior space 14. Ideally the fan housing 10 has a fan 100, a motor 102, and electrical connection (not shown) in the housing interior space 14 when it is sold or installed, although this is not required. The at least one wall 12 is formed to have a square planform shape defined by four sidewalls 16, 18, 20, 22 that are preferably—but not required to be—orthogonal to adjacent sidewalls, each sidewall 16, 18, 20, 22 having a substantially square or rectangular shape. An end wall 24 is formed at a closed end of the housing 10, while the opposing side is an open end. For purposes of the present disclosure, the wall with reference number 16 is denoted as a first wall and the opposing wall will be the second wall 20. The wall connecting the first wall 16 and second wall 20 is denoted as an adjacent wall 22.

The cross-sectional configuration of the housing is that of a square to form a square planform shape. It is to be understood that the cross-sectional shape may vary from a circle to any number of sides (polygon), and other geometric shapes, such as triangle (with three sides) or square, and the three-dimensional housing shape may take other forms, such as a cone.

Each of the sidewalls 16, 18, 20, 22 has a distal end 40 on which is formed a plurality of tabs that include a center tab 32, a pair of intermediate tabs 34, one on each side of and adjacent to the center tab 32, and a pair of outside tabs 36, each outside tab 36 adjacent to a respective intermediate tab 34. Although referred to as tabs, it is to be understood that a tab can be a flange, flap, strip, or similar component. Each tab 32, 34, 36 has optional openings 38 for a fastener if desired. The housing 10 is preferably formed of material, such as aluminum or other material having similar properties, with a thickness that permits manual bending of the tabs about the supporting legs as described below, in order to enable mounting of the housing 10 to a structural member, also as described below. The intermediate tabs 34 and outside tabs 36 extend upward to terminate evenly with a distal edge 44 of their respective wall 16, 18, 20, 22.

Ideally, each of the tabs 32, 24, 36 is co-planar with its respective wall 16, 18, 20, 22, when initially formed. However, the tabs 32, 24, 36 have a different bendable length and different bend lines to limit the length of the tab when it is repositioned to a bent configuration. Ideally the tabs 32, 34, 36 are formed to be bent at substantially a 90-degree angle to be orthogonal to the respective wall 16, 18, 20, 22 to which it is formed. For example, center tab 32 has one or more elongate openings 40 formed at the intersection of the center tab 32 and the respective wall 16, 18, 20, 22. The size and shape of these openings 40 is a matter of design choice and aesthetic appearance. Legs 42 support the tab 32 on the wall 16, 18, 20, 22 and enable bending in response to a manual force exerted on the tab 32. The manual force is preferably that of a human hand or the fingers of the human hand. Hence, the center tab 32 can be repositioned by manually bending about the legs 42 in a range of about 180 degrees either direction and, more preferably, to be orthogonal to the respective wall 16, 18, 20, 22, either towards the interior 14 or towards the exterior of the housing 10, which is described more fully below.

The center tab 32 extends further than the terminal end or distal edge 44 of the respective wall 16, 18, 20, 22 a sufficient distance that, when the housing 10 is placed in the rough opening, the center tab 32 extends down below the exterior surface of the structural member (in this case a ceiling or wall).

The intermediate tab 34 is formed by two longitudinal elongate openings 46, 48 on each side of the intermediate tab 34 of equal length. An elongate opening 40 is formed below the intermediate tab 34 to form two support legs 42 that are sized and shaped to yield to a manual force asserted on the intermediate tab 34, and to bend up to and beyond a 90-degree angle, such as about 180 degrees either direction (limited by bend allowance). As such, the tab 34 can be repositioned to any angle from 0 to about 180 degrees or −180 degrees relative to the wall 22, including a preferred 90 degree or right angle. The length of the intermediate tab 34, when it is repositioned, is determined by the distance of the respective opening 40 from the distal edge 44 of the respective wall 16, 18, 20, 22.

The outside tab 36 is formed by two longitudinal openings 50, 52 on either side and of equal length. The longitudinal opening 48 is longer than the adjacent longitudinal opening 50, and it joins the longitudinal opening 50 with a stepped bottom edge 54. The outside tab 36 is thus supported by two legs 42, as are the other tabs, and these two legs are separated by an elongate opening 40. The legs 42 bend adjacent the elongate opening 40, as do the legs of the other tabs 32, 34. However, the outside tab 36 is longer than the intermediate tab 34 due to the length of the longitudinal openings 50, 52, and this will form a larger tab 36 when force is applied to the tab 36 and the legs 42 bend in either direction. As with the center tab 32 and intermediate tab 34, the outside tab 36 can bend up to about 180 degrees (considering bend allowance) in either direction relative to the respective wall 16, 18, 20, 22. In this design, the outside tab 36 has a width of about ½ inch when it is bent about the legs 42, and the intermediate tab 34 has a width of about ⅝ inch when it is bent about its supporting legs 42.

As shown in the drawings, a duct opening 60 is formed in one of the walls, in this case the longer wall 20, and adjacent one edge of the wall 20. The opening can have a round or square shape, although almost any geometric or irregular shape may be used as needed. There are two L-shaped guides 62 on opposing exterior sides of the vent duct opening 60, each L-shaped guide 62 has a leg 64 spaced away from the wall 20 to create a slot or track for a vent duct connector 68 (shown in FIG. 9) and ducting (not shown).

The housing includes a plurality of corners 91 where two walls of the plurality of walls 16, 18, 20, 22 meet. A pair of first flutes 92 is provided in the first wall 16, and each first flute 92 has a first end 94 and a terminal end 96, the terminal end forming an opening in the adjacent wall 22 that is adjacent to the corner 91 formed by the first wall 16 and the adjacent wall 22. A second pair of flutes 92 is formed in the second wall 20 that is opposite the first wall 16, each flute 92 of the second pair of flutes 92 having a first end 94 and a terminal end 96, the terminal end forming an opening in the adjacent wall 22 that is adjacent to a second corner 91 formed by the second wall 20 and the adjacent wall 22.

Ideally, the first and second pairs of flutes 92 are concave and have an arcuate cross-sectional configuration. Preferably, each flute 92 tapers in diameter from the terminal end 96 to the first end 94 such that each flute 92 has a larger diameter at the terminal end 96 and a smaller diameter at the first end 94.

Installation Process

Figure 9:
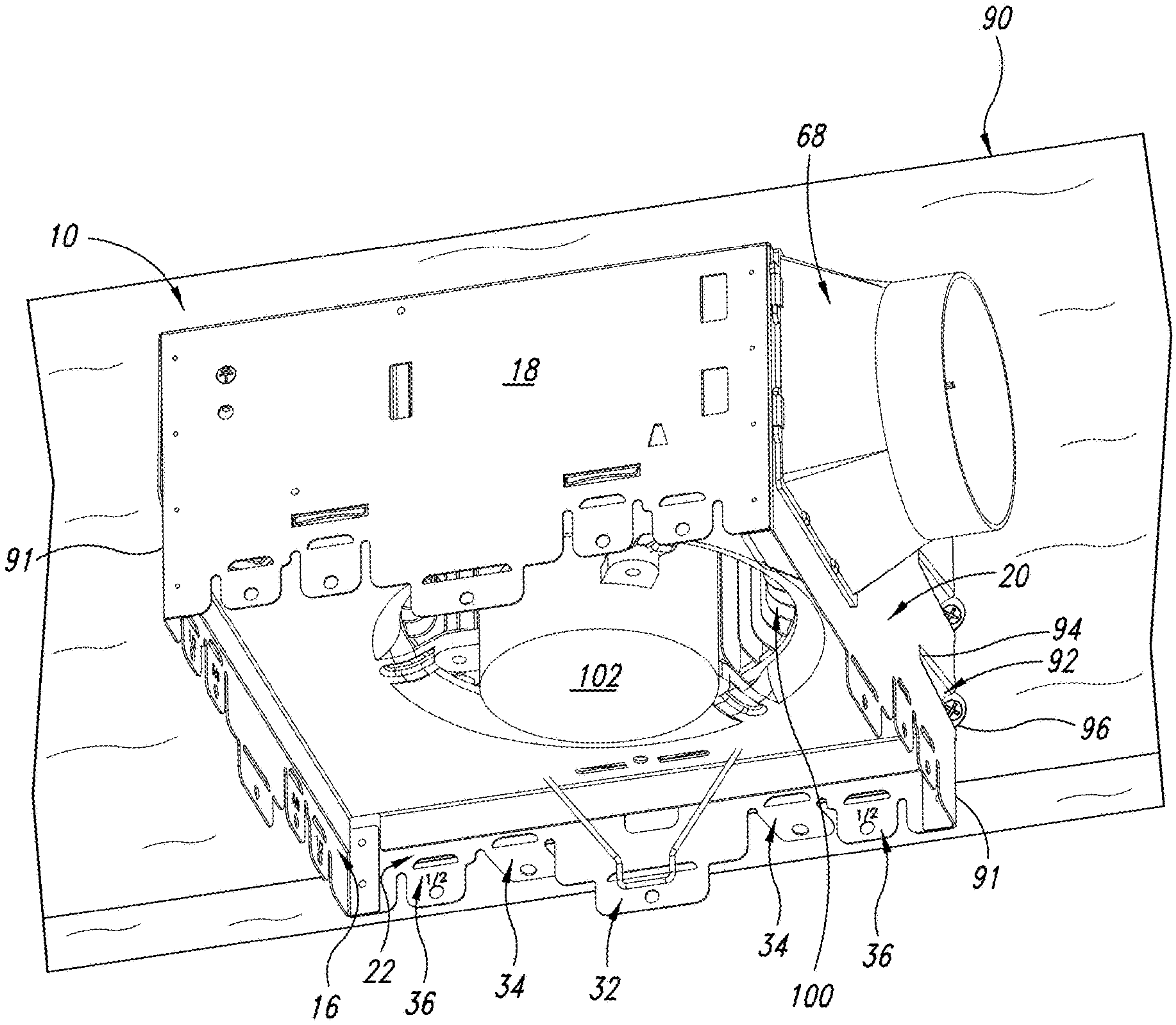
FIG. 9 is a bottom, right, front axonometric view of the ventilation fan housing of FIG. 1 utilizing the mounting system for attachment to a structural joist in accordance with the present disclosure.

If installation is done before the sheet rock is placed on the ceiling or wall, as shown in FIG. 9, then the following steps are utilized. In this example, it is assumed that ⅝-inch sheet rock will be attached to a ceiling joist 90. To accommodate the sheet rock, the two intermediate tabs 34 are bent outward, meaning away from the interior 14 of the housing 10. Ideally, they are bent to be at 90 degrees or orthogonal to the adjacent wall 22.

Next, place the metal fan housing 10 on the floor joist or truss 90 and push up until the two bent tabs 34 bear against the 2-inch bottom of the joist or truss 90 and the adjacent wall 22 is pressed against the side of the joist or truss 90. Hold the housing 10 in place and secure wood screws into the second ends 96 of the flutes 92 to pass through the adjacent wall 22 and into the truss or joist 90. Although there are two flutes 92 on the first wall 16 and two flutes 92 on the second wall 20 of the fan housing 10, it is to be understood that more or less than two flutes 92 may be formed in the housing. Similarly, not all of the flutes 92 need to be utilized among the flutes 92 that are present on the housing 10.

Mounting using the tabs only can also be done as disclosed in applicant's prior U.S. Pat. No. 11,015,822, which is incorporated herein by reference in its entirety and as described below.

Briefly, a rough opening is created in the structural member, here a ceiling, in which the fan and fan housing in which the fan resides are to be mounted. The structural member can be a ceiling, a wall, a soffit, or other structural member of a residential or commercial building. Generally, these structural members are formed from sheet rock or other interior wall or ceiling material that has a typical thickness of ½ inch or ⅝ inch. The rough opening can be created for a new installation, or it can be an existing rough opening in which an old fan is removed. In either situation, the rough opening is prepped for the installation of the fan 100 and housing 10 of the present disclosure by sizing it to the correct dimensions of the housing 10.

After the rough opening is prepared, the fan 100 and the housing 10 in which the fan resides are slid into the rough opening. The vent duct connector 68 is either already installed on the housing 10 as described above or it can be installed at this point by aligning the notches with the upper L-shaped legs 62, then sliding the vent connector 68 downward until it hits a stop extending from the wall 20. The vent duct connector 68 can be installed before or after the housing 10 is placed through the rough opening. The vent duct connector 68 is then coupled to the ducting (not shown) by sliding the open end of the ducting over the nozzle portion of the connector 68.

The installer then repositions all the intermediate tabs 34 to about a 90-degree orientation with the respective wall 16, 18, 20, 22 when the structural member or sheet rock has a thickness of ⅝ inch. Alternatively, when the structural member has a thickness of about ½ inch, the installer will reposition the outside tabs 36 to an orientation of about 90 degrees with respect to the respective wall 16, 18, 20, 22. In either case, the tabs 34 or 36 are repositioned to face outwards away from the interior space 14 of the housing 10.

The housing 10 can now be placed over the rough opening and will be supported on the top side or attic side of the ceiling by the respective intermediate tabs 34 or outside tabs 36. In this example the outside tabs 36 are used due to the thickness of the ceiling material. Next, the installer will reposition the center tabs 32 outward away from the interior 14 of the housing 10 to bear against a bottom side or room side of the ceiling to sandwich the ceiling sheet rock between the center tabs 32 and the respective intermediate tabs 34 or outside tabs 36 as the case may be.

A key feature related to the housing design is that this installation can always be done from the room side and without the need for screws or attic access. In addition, this is particularly useful in situations where tools may not always be available. The tabs can be repositioned or bent more than once, ideally two, three, or more times without failure due to fatigue and in order to facilitate removal and reinstallation as needed.

As will be readily appreciated from the foregoing, this design allows the installer to put the fan housing 10 up inside the rough opening and move it out of the way to work on the vent duct connection and the electrical connection. Preferably eight intermediate or outside tabs 34, 36 hold the housing 10 in the opening from the attic or interior wall side, and the center tabs 32 are used to secure it to the sheet rock on the room side. However, it is to be understood that more than eight or fewer than eight intermediate or outside tabs can be used as desired.

The electrical connections are located towards the room side so the connection can be done from the room side. Another unique feature is the sheet rock grab with the tabs. The notches on the vent duct connector enable the slide-in installation of the vent duct connector 68 and room side electrical to be a combined true "room side" installation or retrofit. New construction has access to studs and attic, so this design and method works well for new construction. This high level of ease on the room side has never been done before.

Another unique aspect of this design is the plastic has two notches so the installer does not need to raise the plastic up as high to get it started in the four metal tracks. This feature allows for a shallow opening installation.

The weight of the fan body and the pinching of the metal tabs is enough to overcome the low fan vibration.

It is to be appreciated that various aspects of the housing 10 and vent duct connector 68, taken alone and in combination, provide an aesthetic appearance that extends beyond any functionality associated therewith. Non-limiting examples include radius of curvature, symmetry, and balance, use of geometric shapes not dictated by function, and the like.

In addition, a combination of the flutes and the tabs may be used to mount the housing 10 by utilizing these two features together. Hence, the installer will have multiple options for installing the housing 10.

The various implementations described above can be combined to provide further implementations. These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

The invention claimed is:

1. An assembly for use in mounting an object in an opening in a structural member, the structural member having opposing first and second surfaces, the assembly comprising:

a housing that is sized and shaped to define an interior to house the object and that can be received within the opening in the structural member, the housing having four walls and having four corners where adjacent walls of the four walls meet; and a first flute formed in a first wall that has a first end and a terminal end, the terminal end forming an opening in an adjacent wall that is adjacent to a first corner formed by the first wall and the adjacent wall, and a second flute formed in a second wall that is opposite the first wall, the second flute having a first end and a terminal end, the terminal end forming an opening in the adjacent wall that is adjacent to a second corner formed by the second wall and the adjacent wall.

2. The assembly of claim 1 wherein the first and second flutes are concave and have an arcuate cross-sectional configuration.

3. The assembly of claim 2 wherein each of the first and second flutes taper in diameter from the first end to the terminal end such that the first and second flutes have a larger diameter at the terminal end and a smaller diameter at the first end.

4. The assembly of claim 3, wherein the housing includes:

a first tab extending from a distal end of the housing, the first tab sized and shaped to be bent to bear against the first surface of the structural member; and a second tab extending from the distal end of the housing, the second tab sized and shaped to engage the second surface of the structural member adjacent the opening and to attach the housing to the structural member;

wherein the first and second tabs are integrally formed with at least one wall, are co-planar with the at least one wall, and are formed of bendable material that retains a bent shape and can be bent more than once without failure, the first and second tabs having a thickness that enables manual bending of the first and second tabs from an original position to at least an angle of 90 degrees with respect to the at least one wall.

5. A housing for use in mounting an object to a structure having a first surface and an opposing second surface, the housing comprising:

a plurality of walls sized and shaped to define an interior to house the object, and a plurality of corners where adjacent walls of the plurality of walls meet; and a first flute formed in a first wall that has a first end and a terminal end, the terminal end forming an opening in an adjacent wall that is adjacent to a first corner formed by the first wall and the adjacent wall, and a second flute formed in a second wall that is opposite the first wall, the second flute having a first end and a terminal end, the terminal end forming an opening in the adjacent wall that is adjacent to a second corner formed by the second wall and the adjacent wall.

6. The housing of claim 5 wherein the first and second flutes are concave and have an arcuate cross-sectional configuration.

7. The housing of claim 6 wherein each of the first and second flutes taper in diameter from the first end to the terminal end such that the first and second flutes have a larger diameter at the terminal end and a smaller diameter at the first end.

8. The housing of claim 7, wherein the housing includes:

a first tab extending from a distal end of the housing, the first tab sized and shaped to be bent to bear against the first surface of the structure; and a second tab extending from the distal end of the housing, the second tab sized and shaped to engage the second surface of the structure adjacent the opening and to attach the housing to the structure;

wherein the first and second tabs are integrally formed with at least one wall, are co-planar with the at least one wall, and are formed of bendable material that retains a bent shape and can be bent more than once without failure, the first and second tabs having a thickness that enables manual bending of the first and second tabs from an original position to at least an angle of 90 degrees with respect to the at least one wall.

* * * * *